Dec. 14, 1926.  J. J. THACHER  1,610,981
AUTOMATIC LATHE
Filed Feb. 26, 1923   3 Sheets-Sheet 3
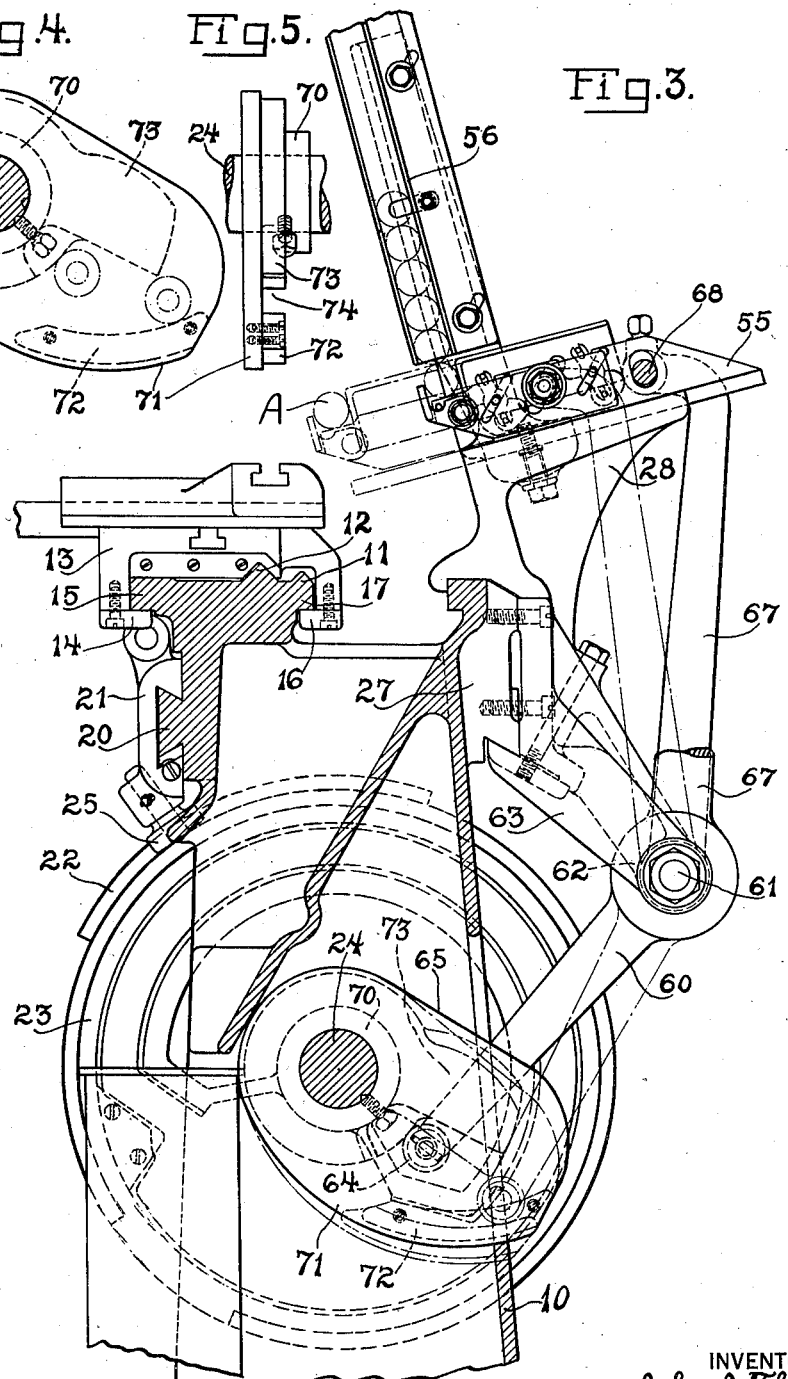
INVENTOR
John J. Thacher
BY
Joseph K. Schofield
ATTORNEY Patented Dec. 14, 1926.

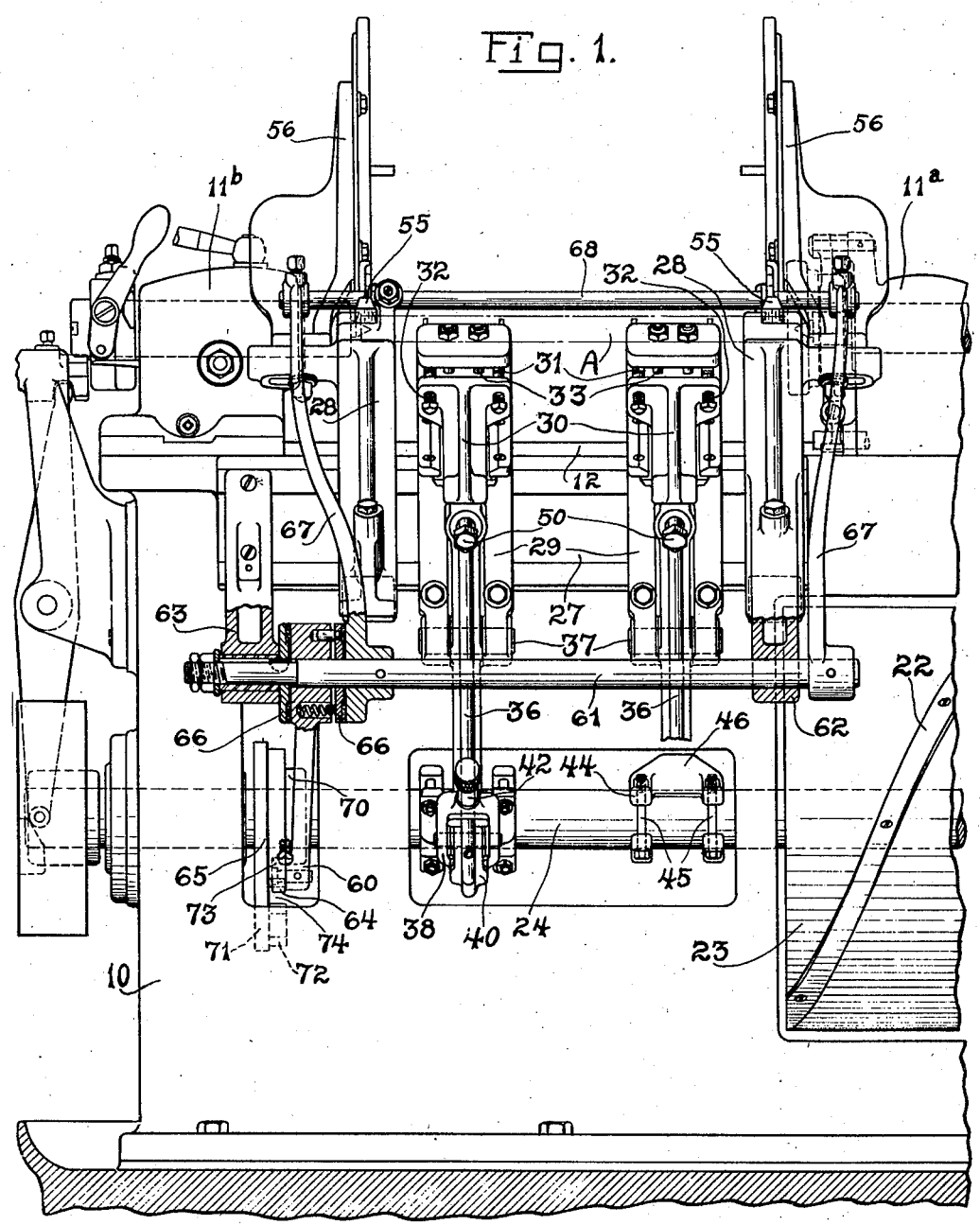

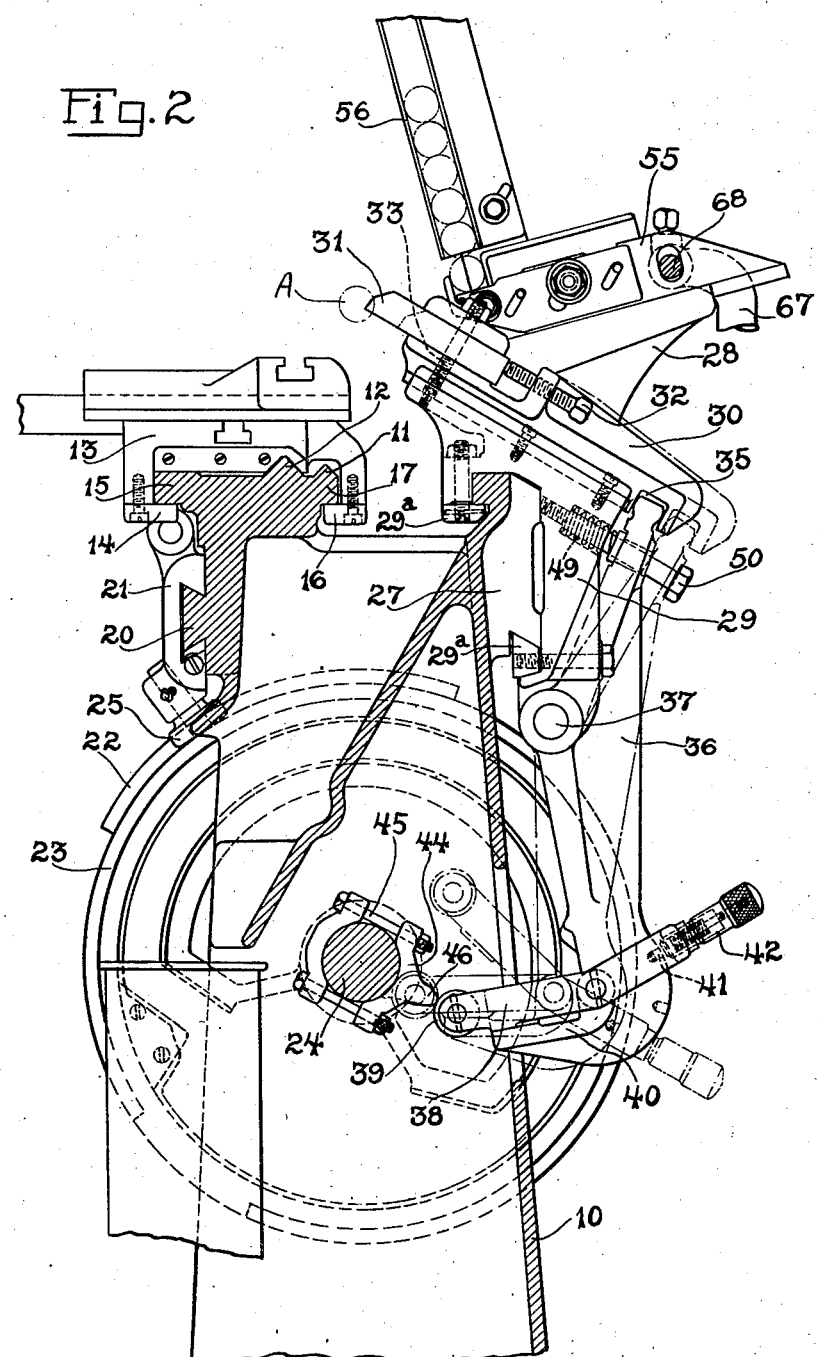

1,610,981

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

AUTOMATIC LATHE.

Application filed February 26, 1923. Serial No. 621,368.

This invention relates to lathes and in particular to a lathe of the automatic type adapted to perform longitudinal cutting operations simultaneously with cutting operations on radial surfaces.

A principal object of the invention is to incorporate a radially operating tool permitting necking operations to be carried on in a machine of the automatic type without interfering with the operation of the usual longitudinally acting tool, or with the other automatic mechanisms of the machine.

One feature which enables me to accomplish the above object is that I mount the radially acting tool upon a fixture adapted to be adjustably secured to the machine upon the rear surface thereof. Preferably the necking fixture is mounted just below the blank transferring mechanism provided on the machine. Also it is so disposed relative to the blank transferring mechanism that these two mechanisms may be utilized during rotation of the work without movements of one interfering with movements of the other.

Another principal object of the invention is to incorporate in a machine of the type disclosed in the patent to Müller 1,252,928, a radially or transversely acting tool, one or more of these being provided so spaced relative to the blank being operated on that one or more of its radial surfaces may be finished at any point along the length of the blank while it is mounted in operative position.

Another object of the invention is to provide a special mounting for the blank transferring mechanism so that the space below it will be ample to provide for the necking fixture, and the b'ank transferring and necking operations may be carried out without interference, both of these mechanisms being actuated in predetermined timed relation to the other by cams mounted on the same main cam shaft.

With these and other objects in view, my invention consists in the features of construction and operation set forth in the following specification and illustrated in the accompanying drawings.

In the accompanying drawings annexed hereto and forming a part of this specification, I have shown my invention embodied in a machine similar to that described in the above mentioned patent, but it will be understood that the invention can be otherwise embodied and that the drawings are not to be construed as defining or limiting the scope of the invention, the claims appended to this specification being relied upon for that purpose.

In the drawings:

Figure 1 is a rear elevational view of the main portions of a lathe showing the operative parts of the present invention mounted thereon.

Fig. 2 is a vertical sectional view showing the blank transferring and radially acting tool mechanisms in position, the headstock being omitted.

Fig. 3 is a similar cross sectional view showing the blank transferring mechanism both in its operative and in its inoperative position.

Fig. 4 is a side view of the same for actuating the transfer mechanism.

Fig. 5 is a view of the cam at right angles to the position shown in Fig. 4.

In the above mentioned drawings, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts: first, a base; second, a headstock and tailstock thereon provided with blank supporting and rotating means; third, blank transferring mechanism adapted to transfer a blank from a magazine on the machine to its operative position on the blank supporting and rotating means; fourth, a longitudinally movable tool slide; fifth, a necking attachment mounted upon the same ways as the transfer mechanism and having a transversely movable tool and slide; sixth, a main cam shaft having cams thereon for actuating the transversely movable tool slide or slides and the transfer mechanism in proper timed relation to each other.

Referring more in detail to the figures of the drawings, a base 10 is provided having a way 11 of V form upon its upper horizontal surface for mounting the headstock 11$^a$ and tailstock 11$^b$. This guideway 11 preferably is independent of the way 12 shown on the forward portion of this horizontal surface for mounting the tool slide 13. As is usual in this type of machines, the tool slide 13 in addition to being guided upon the way 12 has a retaining strip 14 engaging the under surface of the extension 15. Also, if desired, a retaining strip 16 may be provided engaging a rear extension 17. On the front vertical surface of the base is a dove-tailed projection 20 having a slide 21 movable thereon which may be actuated by a cam strip 22 on a cam drum 23 to longitudinally move the tool slide 13. The cam drum is mounted on the main cam shaft 24. A roller 25 on the slide 21 is in engagement with the cam strip 22 so that rotation of the cam shaft 24 and the cam drum 23 will move the slide 21 longitudinally back and forth along the base 10. The above parts are substantially like those of the construction described in the above mentioned patent. On the rear vertical surface of the base 10 is a projection 27 providing clamping means for both the blank transferring mechanism 28 and the radially acting or necking tool fixture 29.

Referring first to the radially or transversely acting tool fixture 29, this comprises a body member adjustably clamped in any position along the projection 27 provided on the vertical surface of the base 10 and having an inclined upper surface provided with suitable forwardly and rearwardly extending ways. As shown in Fig. 2, two clamping strips 29ª are provided, one of which engages under the vertical surface of the rear half of the base. The other clamping strip engages under the lower edge of the projection 29 on the vertical rear wall of the base.

Within the ways on the upper inclined surface of the fixture 29 operates a tool slide 30 upon which may be mounted a tool 31 as shown. This tool 31 may be adjusted in position along the tool slide 30 by the adjusting screw 32 and held securely in its adjusted position by the clamping screw 33. The opposite end of this necking tool slide 30 is provided with a recess 35 having parallel walls which may be engaged by the upper end of a pivoted lever 36. This lever 36 is mounted so that it may be oscillated about a horizontal shaft 37 which is fixed in position in the lower portion of the body member of the necking fixture 29. The lower arm of this lever 36 has pivotally mounted thereon a member 38 carrying a roller 39 at its outer end. This member 38 in operative position bears against a support formed by an angular projecton 40 of the lever 36 and may be thrown into an inoperative position by withdrawing a pin 41 from a recess in the lever 36 by means of handle 42 and oscillating it to the position shown in dotted outline.

In order to actuate this lever 36 to advance the necking tool 31 radially toward the axis of the work blank A, a cam 44 is mounted on the main cam shaft 24. This cam 44 is preferably adjustably fastened to the cam shaft by means of the bolts 45. The cam portion itself on this cam 44 comprises a tooth-like projection 46 which is engaged by the roller 39 on the lever 36 and is adapted to oscillate this lever 36 away from the axis of the cam shaft 24. The remaining portions of the cam may be circumferential or entirely cut away as shown so that during the remaining portion of the revolution of the main cam shaft 24 and its cam 46, no oscillation of the lever 36 will occur. It will be understood from the above that by simply loosening the clamping bolts 45 for the cam 44, the position of the cam portion 46 angularly about the shaft 24 may be varied. Also the cam 46 may be adjusted longitudinally along the shaft 24 in accordance with the position of the attachment 29. It will therefore be understood that if a plurality of the necking fixtures are required for the blank being operated on, the cams 44 may be mounted on the shaft 24 to successively actuate their slides 30. This is accomplished by adjusting the angular positions of the cams 44 on the cam shaft 24.

In order to withdraw the radially acting tool 31 and its slide 30 from engagement with the work A when the cam portion 46 has passed the roller 39, a spring 48 is provided which may be held within a recess of the necking fixture 29, with its outer end bearing against a portion of the upper arm of the lever 36. The spring 49, when the tool slide 30 is advanced toward the work, is compressed so that as soon as the cam 46 releases the actuating lever 36, it will force the lever 36 to oscillate in the opposite direction and thus withdraw the tool slide 30 from the work. In order to limit the outer movement of the tool slide 30, a headed bolt 50 is provided passing through the lever 36 and threadedly engaged by the necking fixture 29.

The blank transferring mechanism 28 is generally similar to that shown in the Müller patent above referred to. It will be noted, however, that the position of this transfer mechanism is elevated and tilted somewhat and is so placed that the transfer members 55 operate to advance the blank from the magazine 56 to work supporting position on a slight incline. By so tilting the fixture 28 holding the transfer mechanism shown generally at 55, ample space below the transfer slide 55 is obtained for the necking attachment 29 and its movable slide 30. It will also be noted that the upper end of the magazine 56 extends forwardly thus facilitating loading of the magazine from the front of the machine.

This transfer slide 55 is actuated by means of a pivoted lever 60, the axis about which it oscillates comprising a shaft 61 mounted upon brackets, one of these brackets 62 may be provided on the transfer mechanism fixture 28. The other bracket 63 may preferably be fixed adjustably to the projection 27 on the rear vertical face of the base 10.

To actuate this transfer mechanism, the lever 60 is provided with a roller 64 which is contacted with and oscillated by means of a cam 65 of special form fixed to and rotating with the main cam shaft 24. This lever 60 is frictionally engaged by members 66 oscillating with the transfer oscillating shaft 61. One of these members 66 contacts with an arm 67 extending vertically upwardly and provided at its upper end with a horizontally mounted rod 68 which is engaged by the transfer slide 55. Preferably a pair of these upwardly extending arms 67 are provided each keyed or otherwise fastened to the oscillating shaft 61. Each of these arms 67 is fastened to the horizontal rod 68.

It will be seen that rotation of the main cam shaft and its cam 65 will at the proper predetermined time oscillate the lever 60 which will frictionally force the arms 67 to oscillate and thus move the slide actuating rod 68 forward and rearward. An inspection of Fig. 1 of the drawings will show that all members of the transfer mechanism 28 may be so positioned that they will not interfere with the adjustability of the necking attachment 29 and that a plurality of the necking attachments 29 may be mounted between the fixtures 28 for the transfer mechanism. The only portions of the transfer mechanism which require adjustment for varying lengths of blanks A are the vertically extending magazine and the fixture at the tailstock end of the machine which are along the way 27. The arms 67, the oscillating shaft 61 and actuating lever 60 may be retained in any fixed position for all lengths of blanks A being operated on.

The cam 65 on main cam shaft 24 is so formed that it oscillates the arm 60 positively in both directions. The cam 65 comprises a body portion 70 and a flange 71 to which a strip 72 is fastened. Another flange-like portion 73 is formed so that a cam groove is formed between the flange 67 and the strip 72. The roller 64 engages one wall of the flange 73 and the edge of the strip 72 so that it is forced back and forth in accordance with the contours of the periphery of the flange 73 and strip 72. Also the position of the cam 65 angularly on the cam shaft 24 is such that the oscillations of lever 60 and movements of the transferring member 55 occurs at the proper point in the cycle of operations of the machine.

What I claim is:

1. A necking attachment for lathes comprising in combination, a body member adapted to be fixed to the base of the lathe, a slide adapted to carry a tool mounted on said body member, a lever pivotally supported on the body member, said lever at its upper end being in engagement with the tool carrying slide and at its lower end adapted to contact with a cam, means to rotate the cam to actuate the tool slide, and means to render said lever inoperative to actuate the slide.

2. A necking attachment for lathes comprising in combination, a body member adapted to be fixed to the base of the lathe, a slide adapted to carry a tool mounted on said body member, a lever pivotally supported on the body member, said lever at its upper end being in engagement with the tool carrying slide and at its lower end adapted to contact with a cam, means to rotate the cam to actuate the tool slide, and means to disengage said lever from the cam to render it inoperative to actuate the slide.

3. A necking attachment for lathes comprising in combination, a body member adapted to be adjustably fixed to the base of the lathe, an obliquely movable slide adapted to carry a tool mounted on said body member, a lever pivotally supported on the body member, said lever at its upper end being in engagement with the tool carrying slide and at its lower end adapted to contact with a cam, means to rotate the cam to actuate the tool slide, and means to disengage said lever from the cam to render it inoperative to actuate the slide.

4. A necking attachment for lathes comprising in combination, a body member adapted to be fixed to the base of the lathe, a slide adapted to carry a tool mounted on said body member, and a lever pivotally supported on the body member, said lever at its upper end being in engagement with the tool carrying slide and the lower arm of said lever being jointed whereby the jointed part may be oscillated out of the path of movement of an actuating cam.

5. A necking attachment for lathes comprising in combination, a body member adapted to be fixed to the base of the lathe, a slide adapted to carry a tool mounted on said body member, a lever pivotally supported on the body member, said lever at its upper end being in engagement with the tool carrying slide and the lower arm of said lever being jointed whereby the jointed part may be oscillated out of the path of movement of an actuating cam, and means to retain the jointed part in operative or inoperative position.

6. A necking attachment for lathes having blank transferring means adapted to position blanks on work supporting and rotating means, said necking attachment comprising a body member mounted on the lathe adjacent said transfer means, means comprising a main cam shaft having cams thereon adapted to actuate the blank transferring means and necking attachment, the path of movement of the necking attachment being directly below that of the transferring mechanism.

7. A necking attachment for lathes having blank transferring means adapted to position work blanks on work supporting and rotating means, said necking attachment comprising a body member mounted on the lathe adjacent said transfer means, means comprising a main cam shaft having adjustable cams thereon adapted to actuate the blank transferring means and the necking attachment, the path of movement of the necking attachment being directly below that of the transferring mechanism, the movements of said transferring means and necking attachment being in predetermined timed relation to each other.

8. A necking attachment for lathes having blank transferring means adapted to position work blanks on work supporting and rotating means, said necking attachment comprising a body member mounted on the lathe adjacent said transfer means, means comprising a main cam shaft having adjustable cams thereon adapted to actuate the blank transferring means and the necking attachment, the path of movement of the necking attachment being directly below and at an angle relative to that of the transferring mechanism.

In testimony whereof, I hereto affix my signature.

JOHN J. THACHER